(12) United States Patent
Kern et al.

(10) Patent No.: US 9,385,641 B2
(45) Date of Patent: Jul. 5, 2016

(54) SYSTEM AND METHOD FOR INDUCING ROTATION OF A ROTOR IN A SENSORLESS MOTOR

(75) Inventors: Lynn R. Kern, Tucson, AZ (US); James P. McFarland, Tucson, AZ (US)

(73) Assignee: STANDARD MICROSYSTEMS CORPORATION, Hauppauge, NY (US)

( * ) Notice: Subject to any disclaimer, the term of this patent is extended or adjusted under 35 U.S.C. 154(b) by 1808 days.

(21) Appl. No.: 12/620,656

(22) Filed: Nov. 18, 2009

(65) Prior Publication Data

US 2011/0115421 A1 May 19, 2011

(51) Int. Cl.
*H02K 29/06* (2006.01)
*H02P 6/20* (2016.01)

(52) U.S. Cl.
CPC .................................. *H02P 6/20* (2013.01)

(58) Field of Classification Search
USPC ............. 318/400.01, 400.09, 400.11, 400.32, 318/700
See application file for complete search history.

(56) References Cited

U.S. PATENT DOCUMENTS

| | | | |
|---|---|---|---|
| 4,259,630 A | 3/1981 | Killian | |
| 4,509,004 A | 4/1985 | Shepard, Jr. | |
| 4,510,422 A | 4/1985 | Ogura | |
| 4,678,973 A | 7/1987 | Elliott et al. | |
| 4,779,034 A | 10/1988 | Shepard, Jr. | |
| 5,017,845 A | 5/1991 | Carobolante et al. | |
| 5,198,733 A | 3/1993 | Wright | |
| 5,315,225 A | 5/1994 | Heinrich et al. | |
| 5,343,127 A | 8/1994 | Maiocchi | |
| 5,350,984 A | 9/1994 | Carobolante et al. | |
| 5,397,972 A | 3/1995 | Maiocchi | |
| 5,455,885 A | 10/1995 | Cameron | |
| 5,489,831 A * | 2/1996 | Harris | 318/701 |
| 5,572,097 A | 11/1996 | Cameron | |
| 5,668,449 A | 9/1997 | Carobolante | |
| 5,703,449 A * | 12/1997 | Nagate et al. | 318/400.01 |
| 5,818,192 A | 10/1998 | Nozari | |
| 5,990,642 A * | 11/1999 | Park | 318/400.04 |
| 6,100,656 A | 8/2000 | El-Sadi et al. | |
| 6,512,342 B2 | 1/2003 | Kawagoshi | |
| 6,639,371 B2 | 10/2003 | Walters et al. | |

(Continued)

OTHER PUBLICATIONS

Ken Berringer, Bill Lucas, Leos Chalupa, and Libor Prokop; "Sensorless Brushless DC Motor Using the MC68HC908MR32 Embedded Motion Control Development System—AN1858"; Freescale Semiconductor; 2004; 36 pages.

(Continued)

*Primary Examiner* — Kawing Chan
(74) *Attorney, Agent, or Firm* — Slayden Grubert Beard PLLC

(57) ABSTRACT

System and method for initiating rotation of a rotor in a motor. The motor may include the rotor and a plurality of pairs of electromagnets. A rotation period may be determined. One or more pairs of electromagnets of the plurality of pairs of electromagnets may be excited at a first excitation level. The excited one or more pairs of electromagnets may be determined based on the rotation period. The excitation level may be decreased, over a first period of time, to a second excitation level. The second excitation level may be a lower excitation level than the first excitation level. The excitation level may be increased, over a second period of time, to a third excitation level. The third excitation level may be a higher excitation level than the second excitation level. The rotation period may be decreased over the first and second periods of time.

22 Claims, 6 Drawing Sheets

(56) References Cited

U.S. PATENT DOCUMENTS

| | | | |
|---|---|---|---|
| 6,995,530 B2 | 2/2006 | Biamonte et al. | |
| 7,202,623 B2 | 4/2007 | Zhou et al. | |
| 2001/0048278 A1 | 12/2001 | Young et al. | |
| 2003/0107348 A1* | 6/2003 | Inagawa et al. | 322/22 |
| 2003/0193306 A1* | 10/2003 | Griffitts | 318/459 |
| 2004/0070355 A1* | 4/2004 | Ogura | 318/280 |
| 2005/0057200 A1* | 3/2005 | Akiyama | 318/66 |
| 2005/0253546 A1* | 11/2005 | Dornhof | 318/439 |
| 2005/0269985 A1* | 12/2005 | Yoshitomi et al. | 318/471 |
| 2006/0125439 A1* | 6/2006 | Ajima et al. | 318/716 |
| 2006/0138986 A1* | 6/2006 | Park et al. | 318/439 |
| 2008/0203964 A1* | 8/2008 | Koike | 318/799 |
| 2010/0102766 A1* | 4/2010 | Kern et al. | 318/400.35 |
| 2011/0115419 A1* | 5/2011 | Kern | 318/400.09 |
| 2011/0291597 A1* | 12/2011 | Kern et al. | 318/400.11 |

OTHER PUBLICATIONS

"Sensorless Motor Control IC for Appliances—IRMCF371"; International Rectifier; Dec. 5, 2006; 30 pages.

Jorge Zambada; "Sensorless Field Oriented Control of PMSM Motors—AN1078"; Microchip; 2007; 30 pages.

"Sensorless Spindle Motor Controller—ML4411/ML4411A"; Micro Linear; May 1997; 15 pages.

"Brushless DC Motor Drive Circuit—TDA5140A"; Philips Semiconductors; Apr. 1994; 24 pages.

"Brushless Motor Driver with Speed Control for Portable Cassette Recorders—LB1877V"; Sanyo; Aug. 1999; 7 pages.

"Fan Motor Driver—LV8800V"; Sanyo; Aug. 2007; 8 pages.

"Sensorless Brushless DC Motor Reference Design—AN208"; Silicon Labs; 2006; 40 pages.

"Sensorless Brushless DC Motor Control with Z8 Encore! MC Microcontrollers—AN022601-0905"; ZiLOG; 2005; 64 pages.

* cited by examiner

SYSTEM AND METHOD FOR INDUCING ROTATION OF A ROTOR IN A SENSORLESS MOTOR

INCORPORATION BY REFERENCE

U.S. patent application Ser. No. 12/393,996 titled "Brushless, Three Phase Motor Drive", filed on Feb. 26, 2009, whose inventors are Lynn R. Kern and James P. McFarland, is hereby incorporated by reference as though fully and completely set forth herein.

U.S. patent application Ser. No. 12/620,679, titled "System and Method for Aligning a Rotor to a Known Position", filed on Nov. 18, 2009, whose inventor is Lynn R. Kern, is hereby incorporated by reference as though fully and completely set forth herein.

U.S. patent application Ser. No. 12/620,726, titled "Brushless, Three Phase Motor Drive", filed on Nov. 18, 2009, whose inventors are Lynn R. Kern, Scott C. McLeod, and Ken Gay, is hereby incorporated by reference as though fully and completely set forth herein.

BACKGROUND OF THE INVENTION

1. Field of the Invention

The invention generally relates to DC (Direct Current) motors used in various applications, such as hard disk drive motors, cooling fans, drive motors for appliances, etc.

2. Description of the Related Art

An electric motor uses electrical energy to produce mechanical energy. Electric motors are used in a large number of applications, including a number of different household appliances, pumps, cooling fans, etc. Motors can generally be classified as either alternating current (AC) motors or direct current (DC) motors.

Motors generally include a rotor, which is the non-stationary (moving) part of the motor, and a stator, which is the stationary part of the motor. The stator generally operates as a field magnet (e.g., electromagnet), interacting with an armature to induce motion in the rotor. The wires and magnetic field of the motor (typically in the stator) are arranged so that a torque is developed about the rotor's axis, causing rotation of the rotor. A motor typically also includes a commutator, which is an electrical switch that periodically reverses the current direction in the electric motor, helping to induce motion in the rotor. The armature carries current in the motor and is generally oriented normal to the magnetic field and the torque being generated. The purpose of the armature is to carry current crossing the magnetic field, thus creating shaft torque in the motor and to generate an electromotive force ("EMF").

In a typical brushed DC motor, the rotor comprises one or more coils of wire wound around a shaft. Brushes are used to make mechanical contact with a set of electrical contacts (called the commutator) on the rotor, forming an electrical circuit between the DC electrical source and the armature coil-windings. As the armature rotates on axis, the stationary brushes come into contact with different sections of the rotating commutator. The commutator and brush system form a set of electrical switches, each firing in sequence, such that electrical-power always flows through the armature coil closest to the stationary stator (permanent magnet). Thus an electrical power source is connected to the rotor coil, causing current to flow and producing electromagnetism. Brushes are used to press against the commutator on the rotor and provide current to the rotating shaft. The commutator causes the current in the coils to be switched as the rotor turns, keeping the magnetic poles of the rotor from ever fully aligning with the magnetic poles of the stator field, hence maintaining the rotation of the rotor. The use of brushes creates friction in the motor and leads to maintenance issues and reduced efficiency.

In a brushless DC motor design, the commutator/brushgear assembly (which is effectively a mechanical "rotating switch") is replaced by an external electronic switch synchronized to the rotor's position. Brushless DC motors thus have an electronically controlled commutation system, instead of a mechanical commutation system based on brushes. In a brushless DC motor, the electromagnets do not move, but rather the permanent magnets rotate and the armature remains static. This avoids the problem of having to transfer current to the moving armature. Brushless DC motors offer a number of advantages over brushed DC motors, including higher efficiency and reliability, reduced noise, longer lifetime (no brush erosion), elimination of ionizing sparks from the commutator, and overall reduction of electromagnetic interference (EMI).

One technique used to reduce the power required in some applications has been the introduction of Three Phase Brushless Motors. The typical configuration for these motors is shown in FIG. 1. The drive electronics for these motors typically rely on Hall elements (Hall effect sensors) to detect the absolute position of the rotor at all times, and switch drive transistors to maintain motor rotation. A Hall effect sensor is a transducer that varies its output voltage in response to changes in magnetic field. The motors are often electrically connected in a "Y" configuration, so named due to the resemblance to the letter "Y". The common point for the three coils is connected to the electrical source, and the drive electronics switch the drive transistors to maintain the rotating electromagnetic field required to turn the motor.

A second method requires the use of six (6) drive transistors. In this configuration, one high- and low-side pair are on at any point in time, completing the electrical circuit through two of the three legs of the motor. Using the un-energized coil as a magnetic sensor to determine the rotor position is known as Back Electro-Motive Force (BEMF) detection. The motivation for this technique is the elimination of the relatively expensive Hall elements and associated electronics. BEMF commutation techniques have successfully been applied to a wide-range of motors. One issue that arises when using BEMF detection is that if the rotor is not moving, there is no BEMF to be detected. This means a special technique may be required for inducing rotation of the rotor until the rotational speed is sufficient to detect a BEMF signal.

Prior art solutions typically use a brute-force method to drive the motor coils during start-up, which may last several seconds, and may draw several times the normal operating current. The period of time when this occurs is referred to in the literature as the Forced Commutation phase of spin-up. This is one of the drawbacks of the BEMF commutation method. Until the motor spins sufficiently fast enough to generate a BEMF signal, the motor is typically driven open loop, at a pre-determined frequency and pulse width modulation (PWM) duty cycle, putting undue stress on the motor components. The currents used are often sufficient to damage the motor windings, and without a feedback method, a timer must expire before the damaging condition can be detected, and corrected. In some solutions, there is no provision for this event, and the motor will continue to drive to destruction.

Therefore, improvements in motor design and operation are desired.

When cooling any computing platform, power is necessarily consumed to remove heat produced by other components in the system. Traditionally, this has not been a large concern, as the platforms consumed much more power than the fan used in removing the heat. As the power consumption of all platforms is reduced, the cooling system consumes power that could either be used to extend battery life in laptops, or to reduce the carbon footprint of server systems. Therefore, improvements in motors used in cooling systems are also desired.

SUMMARY OF THE INVENTION

Various embodiments are presented of a system and method for inducing rotation of a rotor in a motor. The motor may be an electronic motor, and may include a rotor having one or more permanent magnets. The one or more permanent magnets may be physically positioned in- or out-board of the stationary section of the motor, referred to as the stator, which may include a plurality of pairs of electromagnets. In some embodiments, the motor may be a three phase motor, and the plurality of pairs of electromagnets may include three pairs of electromagnets.

The system may include logic for controlling operation of the motor. The logic may be analog and/or digital, e.g., the logic may include one or more state machine based controllers and/or one or more application specific integrated circuits. The motor may instead (or in addition) include a processor, such as a microcontroller, and a computer accessible memory medium storing program instructions executable to control the motor. The processor may be configured to execute program instructions from the memory medium to control the motor.

The logic may be configured to induce rotation of the rotor. The logic may be configured to perform some or all of the steps of the method described below. A rotation period may be determined. The rotation period may be used to determine commutation timing, according to some embodiments. One or more pairs of electromagnets of the plurality of pairs of electromagnets may be excited at a first excitation level. The excited one or more pairs of electromagnets may be determined based on the rotation period. For example, in some embodiments, a commutation pattern together with the commutation timing determined based on the rotation period may be used to determine which pairs of electromagnets are excited (e.g., at the first excitation level) at any given time.

The excitation level may be decreased to a second excitation level over a first period of time. The second excitation level may be a lower excitation level than the first excitation level. The excitation level may then be increased to a third excitation level over a second period of time. The third excitation level may be a higher excitation level than the second excitation level. In some embodiments, increasing the excitation level to the third excitation level may include incrementing the excitation level of the one or more pairs of electromagnets through one or more intermediate excitation levels over the second period of time. The second period of time may be longer than the first period of time. In other words, the excitation level may be decreased to the second excitation level relatively quickly, then more slowly increased to the third excitation level. In some embodiments, the first, second, and third excitation levels may be percentages of a maximum pulse width modulation (PWM) duty cycle, or may be linear voltages, e.g., depending on the type of motor used.

The rotation period may be decreased over the first and second periods of time. In some embodiments, decreasing the rotation period over the first and second periods of time may include decrementing the rotation period through one or more intermediate rotation periods over the first and second periods of time.

The above described steps may serve to initiate rotation of the rotor in the motor. That is to say, the combination of exciting the one or more pairs of electromagnets, decreasing the excitation level to the second excitation level over a first period of time, increasing the excitation level to the third excitation level over a second period of time, and decreasing the rotation period over the first and second periods of time, e.g., as described above, may initiate rotation of the rotor in the motor.

The above method may provide significantly greater motor performance, e.g., increased efficiency, as compared to prior art designs. In particular, using a non-monotonic drive profile to overcome motor inertia, while using a near linear period profile, may provide a way to start the motor that requires less current than prior art solutions. The method may also be less susceptible to potentially damaging over-current conditions during start-up than prior solutions which drive at or near a maximum input voltage during forced commutation. In addition, the method is simple enough that it can be implemented as part of a more compact and efficient control mechanism design, which may further reduce overall power usage.

The above method may be especially well suited for certain applications, such as motors which drive fans, impellers, or other loads whose torque load is proportional to the angular velocity squared. Since in these embodiments there is virtually no load at low speeds, very little energy may be required to keep the motor turning, once inertia has been overcome. Embodiments of the above method may produce a drive profile which matches these types of loads, making operation more efficient and more effective.

Figure 1A:
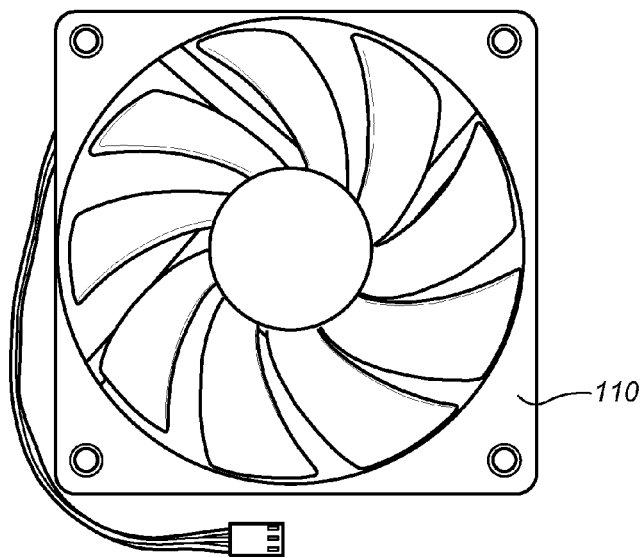
FIGS. 1A and 1B illustrate different views of an exemplary fan and fan motor according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Figure 1B:
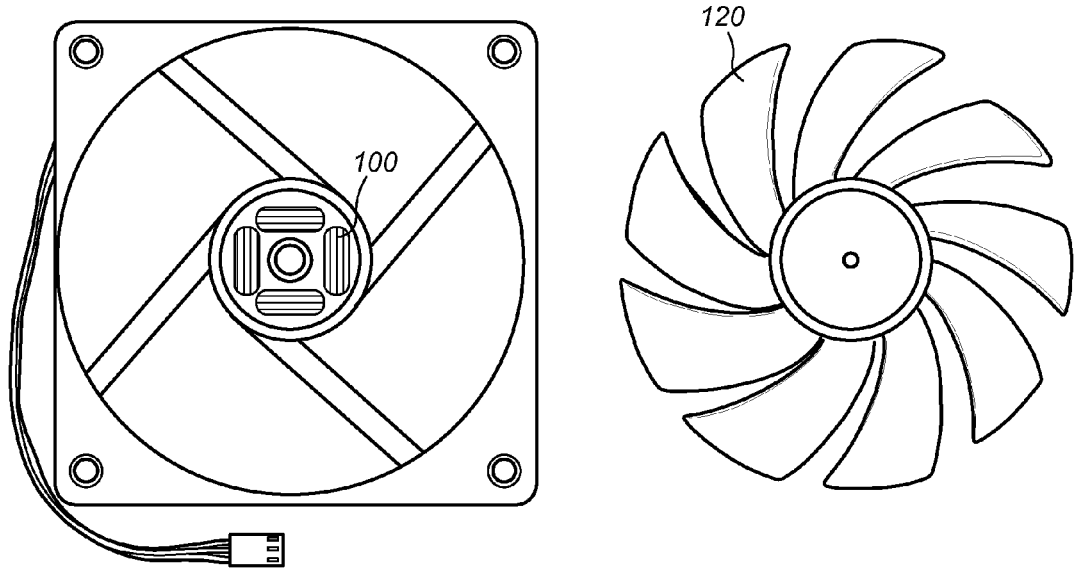

FIGS. 1A and 1B—Exemplary Fan and Fan Motor

FIGS. 1A and 1B illustrate an exemplary fan assembly 110 according to one embodiment. The fan 110 may be a cooling fan, for example a fan for use in a laptop or a desktop computer. The fan 110 may alternatively be a commercial or industrial fan, or in general any type of fan driven by a motor. The fan assembly 110 may include a motor assembly 100 as well as fan blades 120. The motor assembly 100 may comprise a motor (e.g., 102, FIG. 2) as well as drive circuitry (e.g., 402, FIG. 4) for controlling the motor 102.

Although FIGS. 1A and 1B illustrate a fan as the load being driven by the motor, it should be noted that the system and method for aligning a rotor to a known position as described herein may be suited for driving any of various types of loads, including without limitation hard disk drives, drive motors for appliances, propellers, wheels, pumps, or other loads.

Figure 2:
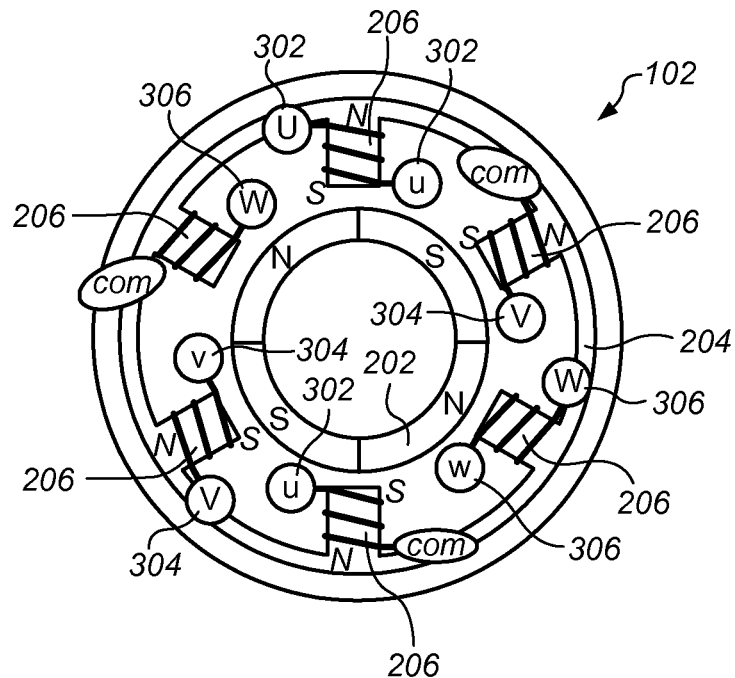
FIG. 2 illustrates a simplified diagram of a brushless four-pole three-phase electric motor according to one embodiment.

FIG. 2—Brushless Four-Pole Three-Phase Motor

FIG. 2 illustrates a simplified diagram of an exemplary brushless four-pole three-phase motor 102. The motor 102 may be electrically powered, e.g., by direct current (DC) electricity. The motor may also be electronically controlled. The motor 102 may include a rotor 202, which may include one or more permanent magnets. The rotor 202 may have four poles, as shown. Alternatively, the rotor 202 may include two, six or another number or poles. The motor may include a stator 204 comprised around the rotor 202, which may include a plurality of electromagnets 206. There may be six electromagnets 206, which may be arranged at equal spacing around the stator 204. The electromagnets 206 may be arranged as three pairs of electromagnets, such that each pair of electromagnets may variously be powered in different phases than the other pairs. The three pairs of electromagnets 206 may be connected in a "Y" configuration. Thus the motor 102 may be a three phase motor. The motor 102 may be brushless, e.g., may not include any brushes connecting current to the rotor 202. Additionally, the motor 102 may be sensor-less, e.g. may not include a discrete rotor position sensing mechanism such as one or more Hall sensors. While the motor is operating, two of the three pairs of electromagnets on the stator 204 may be driven to induce or maintain rotation of the rotor 202 at any given time. The motor 102 may then utilize one of the undriven electromagnets of the stator 204 to indirectly detect the position of the rotor 202. Since the indirect detection of the rotor's 202 position can only occur when the rotor is already spinning, one or more special techniques may be used to place the rotor in a known position and/or force the rotor to begin rotating even without knowledge of the rotor's exact position. The present disclosure relates primarily to such techniques for inducing rotation of the rotor, e.g., once the rotor has been placed in a known position. Application Ser. No. 12/620,679, titled "System and Method for Aligning a Rotor to a Known Position", which is incorporated by reference above, discusses techniques for aligning the rotor to a known position in greater detail.

The phases of the stator 204 may be driven in a pattern ideally configured to induce rotation of the rotor 202. The polarity of the electromagnets 206 may be periodically commutated as part of this pattern.

Figure 3:
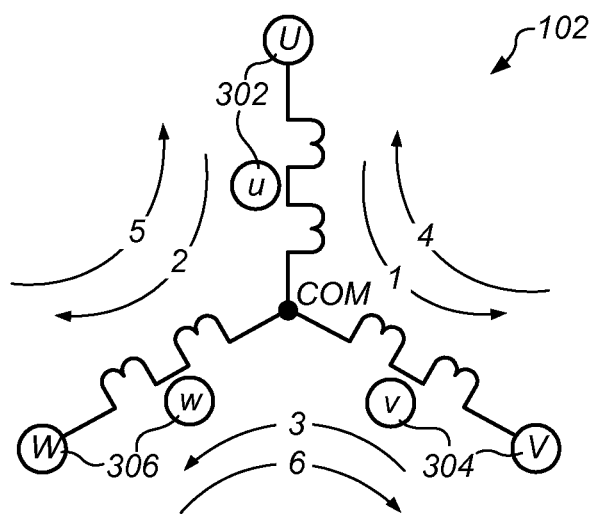
FIG. 3 illustrates a commutation pattern of a brushless three phase electric motor according to one embodiment.

FIG. 3—Commutation Pattern of a Brushless Three-Phase Motor

FIG. 3 illustrates a simplified circuit diagram depicting a commutation pattern of a brushless three phase motor according to one embodiment. The motor 102 may be a brushless, three-phase DC motor as described above. The electromagnets 206 may be connected in a "Y" configuration as shown. The motor 102 may also be a sensor-less motor as described above, e.g., may utilize an undriven stator electromagnet to indirectly detect the position of the rotor (or the motor 102 may include Hall sensors). The motor 102 may determine the timing of each commutation of the commutation pattern according to any of various techniques, e.g., depending on the phase of motor operation, or for other reasons. For example, as will be described further below, in the forced commutation phase of operation, the commutation timing may depend on a rotation period determined specifically for forced commutation. Other ways of determining commutation timing, such as any of the embodiments described in application Ser. No. 12/393,996, titled "Brushless, Three Phase Motor Drive", which is incorporated by reference above, may be used for the natural commutation phase of operation. To control rotation of the rotor 202, two pairs of the electromagnets on the stator 204 may typically be driven at any one time. A given pair may be driven on the 'high side' or the 'low side', indicating in which direction current is being run through the windings of that pair of electromagnets. Depending on the number of poles in the rotor, the electromagnets of a pair may be wound in the same direction or in opposite directions. For example, with a four pole rotor (as shown in FIG. 2), the windings may be configured such that the opposite sides of an electromagnet pair may present the same polarity (e.g., 'S') to the rotor, while with a two pole rotor, the windings may be configured such that the opposite sides may present opposing polarity (e.g., one 'S', one 'N'). Thus in some cases the convention used to define the polarities indicated by 'high side' and 'low side' may depend on the rotor magnetics. Other naming and/or driving conventions may also be possible.

A commutation cycle may include six phases. The phases may correspond to the numbered arrows in FIG. 3. In FIG. 3, each arrow points from the high side driven pair to the low side driven pair. Thus for example, '1' may indicate that in the first phase of the cycle, the 'U' pair 302 of electromagnets may be driven on the high side, while the 'V' pair 304 of electromagnets may be driven on the low side, while the 'W' pair 306 of electromagnets may remain undriven. '2' then would indicate that in the second phase of the cycle, the 'U' pair 306 may again be driven on the high side, while the 'W' pair 304 may be driven on the low side, and the 'V' pair 302 may be undriven. Each of the remaining numbered phases would operate in a similar manner to create a full commutation cycle which could be repeated to increase, maintain, or otherwise affect rotation of the rotor.

If the motor 102 is a DC powered motor, rotational speed may be controlled by means of pulse width modulation (PWM) of the electromagnets. Generally speaking, a PWM duty cycle may indicate how fast the rotor 202 should rotate. More specifically, the PWM duty cycle may specify how often and with how much power to drive the electromagnets of the stator. Alternatively, direct linear voltages may be used to excite the coils of the electromagnets, in some embodiments.

Figure 4:
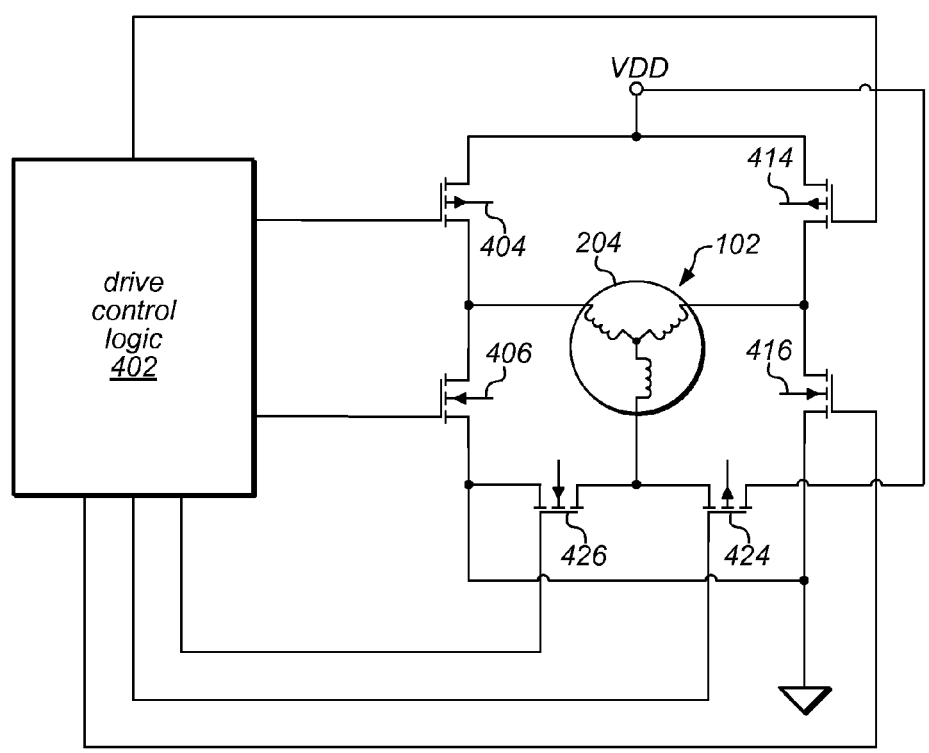
FIG. 4 is a circuit diagram of a motor with drive control logic according to one embodiment.

FIG. 4—Circuit Diagram of a Motor with Drive Control Logic

FIG. 4 illustrates a simplified circuit diagram of a motor and its drive control logic 402. The motor may be a sensor-less, brushless, three-phase motor as described above and illustrated in the various Figures. As shown, the motor may include a stator 204, which may include three pairs of electromagnets. Each pair of electromagnets may have a corresponding pair of transistors, e.g., field effect transistors (FETs). The transistors may be configured such that each pair of electromagnets is effectively bipolar, e.g., the polarity may be reversible. In other words, for each electromagnet pair, one transistor may drive the pair on the high side, or the other transistor may drive the pair on the low side. For example, FET 404 may be the high side transistor for the 'U' pair 302, while FET 406 may be the low side transistor for the 'U' pair of electromagnets 302. Similarly, FETs 414, 416 may be the respective high and low side transistors for the 'V' pair of electromagnets 304, while FETs 424, 426 may be the respective high and low side transistors for the 'W' pair of electromagnets 306. In addition to the particular embodiment shown, any number of other wiring configurations (e.g. using a different number or type of transistor) may also be possible.

The transistors for each pair of electromagnets may be controlled by drive control logic 402. The drive control logic 402 may be electronic logic configured to perform various operations as described herein, such as exciting one or more of the pairs of electromagnets, at various excitation levels, in order to induce rotation of the rotor. In addition to any rotation inducing (e.g., forced commutation) functions, the drive control logic 402 may have logic for controlling the motor under other conditions; for example, the drive control logic 402 may include logic for braking and/or rotor alignment related functions; logic for controlling steady state or natural commutation operation of the motor; logic for determining if a stall condition exists; and/or logic for other functions, as well as logic for switching from one function to another at an appropriate time.

In some embodiments, the drive control logic 402 may also receive signals from one or more outside control devices, such as a fan speed control device. Other outside control devices are also envisioned. Alternatively, such control devices may be incorporated into the drive control logic 402.

The drive control logic 402 itself may be any of various types of logic, e.g., analog or digital, or a combination thereof. For example, the drive control logic 402 may be implemented as a processor, e.g. a microcontroller, executing instructions comprised on a memory medium; a state-machine based digital controller; a Field Programmable Gate Array (FPGA) and/or a mixed signal application specific integrated circuit (ASIC). Alternatively, the drive control logic 402 may include any combination of the above. The drive control logic may thus be implemented using any of various digital or analog techniques, or a combination thereof, as would be apparent to one of ordinary skill in the art.

Figure 5:
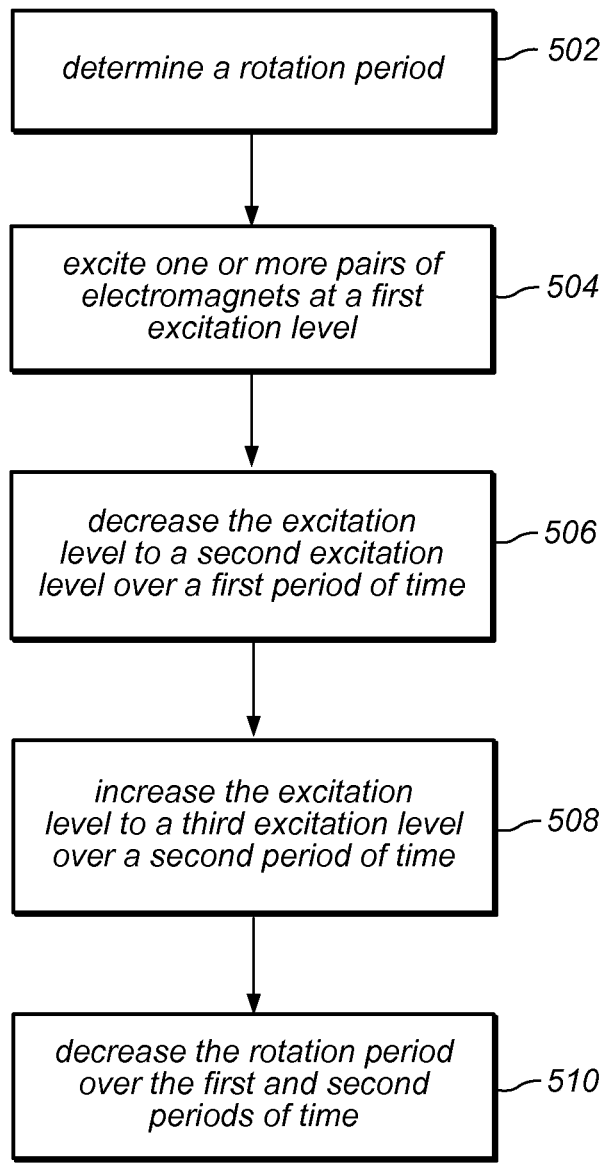
FIG. 5 is a flowchart diagram describing a method for inducing rotation of a rotor in a motor according to one embodiment.

FIG. 5—Flowchart Illustrating a Method for Inducing Rotation of a Rotor in a Motor FIG. 5 illustrates a method for inducing rotation of a rotor in a motor according to one embodiment. Embodiments of the method described below may be particularly suitable for implementation in a sensorless, brushless, three phase DC electric motor. For example, as described above, in such a motor it may not be possible to detect the position of the rotor until the rotor is already spinning. Thus, a special technique, such as described below, may be used to force the rotor to begin rotating until sufficient rotational velocity has been built up to detect a BEMF. However, although the method described below may be particularly suitable in such a sensorless motor, it will be apparent that the technique may also be used in other types of motors if desired. That is to say, initiating rotation is an essential aspect of motor operation, and the techniques described herein may, in some embodiments, be suitable for a variety of types of motor.

The motor 102 may be a brushless, three-phase motor as described above and illustrated in the various Figures. The motor 102 may thus include a rotor 202 which may include one or more permanent magnets. The one or more permanent magnets on the rotor 202 may include four poles; alternatively the permanent magnet may include two, six, or another number of poles. The motor may also include a stator 204. The stator 204 may be positioned around the rotor 202, and may include a plurality of electromagnets 206. For example, there may be six electromagnets 206 on the stator 204, which may operate as three pairs of electromagnets 206. Each pair 302, 304, 306 of electromagnets may be positioned opposite one another. The plurality of electromagnets 206 may be evenly distributed around the stator 204.

The method may be implemented by logic 402 comprised in the motor assembly 100. For example, the logic 402 (which implements the method described herein) may comprise a processor, e.g., a microcontroller, executing instructions comprised on a memory medium; a state-machine based digital controller; and/or a mixed signal application specific integrated circuit (ASIC). Alternatively, the method may be implemented by any combination of the above.

In 502, a rotation period may be determined. The rotation period may be used to determine which pair(s) of electromagnets to excite at any given. The rotation period may also be used to determine when to commutate the various pairs of electromagnets. For example, the motor may be driven according to the commutation pattern such as the one shown in and described with respect to FIG. 3, and the rotation period may determine the timing of the commutation pattern.

Because the method may be initiating rotation of the rotor substantially from rest, the initial rotation period may be relatively long. However, the actual length of the rotation period may depend strongly on the application of the motor, e.g., the load to which the motor is applied; thus the initial rotation period may be "relatively" long in that the initial rotation period may be longer than subsequent rotation periods for a given application of the motor. Initial (and subsequent) rotation periods between different motor applications may vary widely.

In 504, one or more pairs of electromagnets may be excited at a first excitation level. The one or more pairs of electromagnets may be less than all of the plurality of electromagnets. For example, in one embodiment, two pairs of electromagnets may be excited at a time: typically, one pair may be excited on the 'high' side while one pair may be excited on the 'low' side. The particular pair(s) of electromagnets that are excited may be determined based on the rotation period. For example, at different times in the commutation pattern (whose timing may be determined by the rotation period), different pairs of electromagnets should be excited in order to most effectively induce rotation. The excitation of the one or more pairs of electromagnets may be excitation by pulse-width modulation (PWM), or alternatively, may be excitation by linear voltages. Thus, in some embodiments, the first excitation level (and any subsequent excitation levels) may be either PWM duty cycles, or linear voltage levels.

In some embodiments, the motor may have optimal or practical minimum and/or maximum excitation levels. For example, there may be a minimum PWM duty cycle and a maximum PWM duty cycle, or minimum and maximum linear voltages, with which the electromagnetic coils may (or should) be driven. In some embodiments, the first excitation level may be a maximum excitation level; in other words, the method may begin by exciting a single pair of electromagnets at a maximum excitation level. This may be desirable as an initial "push", in order to induce the first movement of the rotor, e.g., to overcome static friction. Alternatively, the first excitation level may not be the maximum excitation level, if desired.

In 506, the excitation level may be decreased to a second excitation level. The decrease may occur over a first period of time. Decreasing the excitation level to the second excitation level may include decrementing the excitation level through one or more intermediate excitation levels over the first period of time. For example, the one or more pairs of electromagnets may first be excited at the first excitation level, then after a first time increment, the excitation level may be decremented to a first intermediate excitation level. After a second time increment, the excitation level might again be decremented, e.g., to a second intermediate excitation level. As many such incremental decreases in excitation level may be performed as are desired, e.g., for a smoother decrease in excitation. The decrement levels, and time increments, may be as small or as large as desired. Alternatively, only one, or no intermediate decrementations may be performed, if desired. Thus, in some embodiments, decreasing the excitation level to the second excitation level may be done in a single decrement.

The second excitation level may be lower than the first excitation level. In some embodiments, the second excitation level may be a minimum excitation level, e.g., a minimum optimal or practical PWM duty cycle or linear voltage.

In some embodiments, the decrease to the second excitation level may occur relatively quickly; in other words, the first period of time may be relatively short. This may be desirable because once the rotor begins to rotate (e.g., once motor inertia has been overcome), the actual load may be minimal. This may especially be the case in applications in which the load is an impeller or fan, as the torque loads in such applications may be proportional to the angular velocity squared of the rotor. In other words, at the very low rotational speeds of the initial period of forced commutation (once inertia has been overcome), relatively little energy may be required to keep the motor turning. Thus, it may make sense to decrease the excitation level at which the coils are driven from the first excitation level to the second excitation level relatively quickly.

It should be noted that over the first period of time, which of the one or more pairs of electromagnets are being excited may continue to periodically change, e.g., according to the commutation pattern and at intervals according to the timing determined by the rotation period. As noted below, the rotation period may also be changing during this time.

In 508, the excitation of the one or more pairs of electromagnets may be increased to a third excitation level. The increase may occur over a second period of time. Increasing the excitation level to the second excitation level may include incrementing the excitation level through one or more intermediate excitation levels over the second period of time. Such incrementation may be similar to the decrementation described above with respect to step 506. For example, in the second period of time, the one or more pairs of electromagnets may at first be excited at the second excitation level, then after a first time increment, the excitation level may be incremented to a first intermediate excitation level. After a second time increment, the excitation level might again be incremented, e.g., to a second intermediate excitation level. As many such incremental increases in excitation level may be performed as are desired, e.g., for a smoother increase in excitation. The increment levels, and time increments, may be as small or as large as desired. Alternatively, only one, or no intermediate incrementations may be performed, if desired. Thus, in some embodiments, increasing the excitation level to the third excitation level may be done in a single decrement.

The third excitation level may be higher than the second excitation level. In some embodiments, the third excitation level may be the maximum excitation level, e.g., a maximum optimal or practical PWM duty cycle or linear voltage. Thus, in some embodiments, the excitation of the one or more pairs of electromagnets may initially be a maximum excitation level, then may be decreased to a minimum level, then gradually increased again to a maximum excitation level.

In some embodiments, the increase to the third excitation level may occur over a relatively long period of time; for example, the second period of time may be longer than the first period of time. This may be desirable in order to smoothly and efficiently accelerate the rotor to a speed at which the BEMF will be sufficient to detect the position of the rotor. It should be noted that a "relatively long" second period of time may refer primarily to the second period of time being longer than the first period of time; depending on the application, both the first and second periods of time may be relatively short on a human scale, in some embodiments. For example, embodiments are contemplated in which the entire method may be performed in milliseconds; other timescales (e.g., microseconds, seconds, or other timescales) are also contemplated.

It should be noted that over the second period of time, just as over the first period of time, which of the one or more pairs of electromagnets are being excited may continue to periodically change, e.g., according to the commutation pattern and at intervals according to the timing determined by the rotation period. As noted below, the rotation period may also be changing during this time.

In 510, the rotation period may be decreased over the first and second periods of time. In other words, over the entire period of time during which the excitation level of the one or more pairs of electromagnets is being decreased and then gradually increased again, the rotation period may be decreasing. As the rotation period is decreased, the frequency of the rotor's rotation will correspondingly increase; that is to say, the rotor will spin faster.

Decreasing the rotation period may include decrementing the rotation period through one or more intermediate rotation periods over the first and second periods of time. For example, the rotation period may be a first rotation period, then after a first time increment, the rotation period may be decremented to a first intermediate rotation period. After a second time increment, the rotation period might again be decremented, e.g., to a second intermediate rotation period. As many such incremental decreases in rotation period may be performed as are desired, e.g., for a smoother increase in rotational frequency. The decrement levels, and time increments, may be as small or as large as desired. Alternatively, only one, or no intermediate decrementations may be performed, if desired. Thus, in some embodiments, decreasing the rotation period may be done in a single decrement.

After the second period of time, the rotor may be rotation at a sufficient angular velocity that a BEMF may be detected and used to determine the position of the rotor. In other words, exciting the one or more pairs of electromagnets, decreasing the excitation level to the second excitation level over the first period of time, increasing the excitation level to the third excitation level over the second period of time, and decreasing the rotation period over the first and second periods of time may effectively initiate rotation of the rotor in the motor. Once this occurs, control of the motor may be passed to a different portion of the drive control logic, such as logic for controlling natural commutation operation of the motor according to any of various embodiments.

An exemplary drive profile which could be implemented according to an embodiment of the method described herein is shown as FIG. 7, and described further below with respect thereto.

The method described herein combines the increasing frequency which may be required to accelerate the motor, and the low excitation levels which may be used to drive low speeds in Natural Commutation. Rather than using a linear acceleration table, a much more linear table may be used, and the excitation level may be varied such that the initial period receives a relatively high (e.g., a programmed maximum)

excitation level to overcome inertia, and then successively decreasing periods (increasing frequency) use excitation levels ramping up from a relatively low (e.g., a programmed minimum) excitation level.

One significant advantage of this method is the reduced current required to start the motor. The use of a non-monotonic drive profile to overcome motor inertia, while using a near linear period profile provides an excellent method of starting a brushless three phase DC motor, and may be particularly applicable in blower/fan applications. The fact that impellers or fans present a torque load that is proportional to the angular velocity squared means there is essentially no load at start. The method described herein leverages the fact that since there is essentially no load, it requires relatively little energy to keep the motor turning, once inertia has been overcome.

Figure 6:
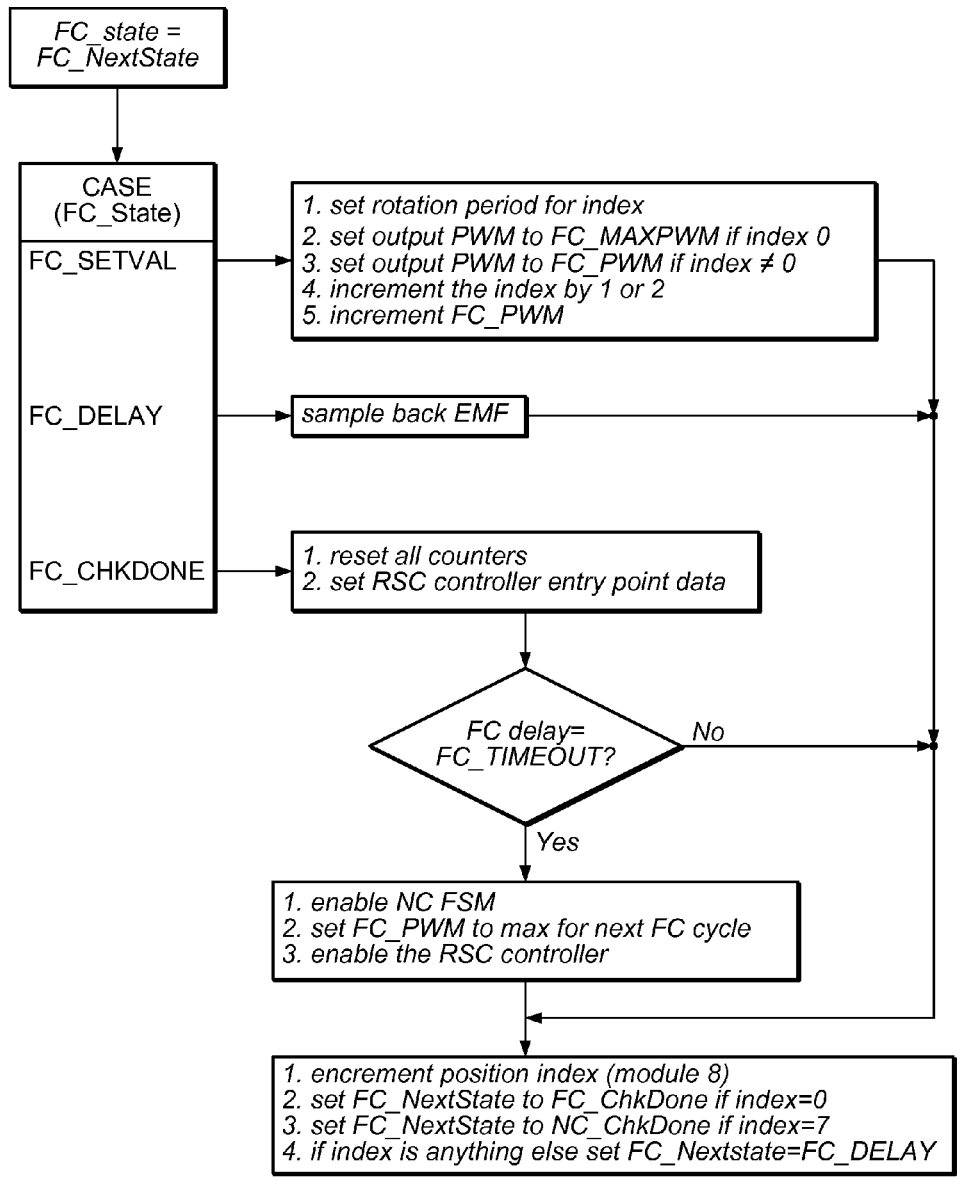
FIG. 6 illustrates a finite state machine implementation of a method for inducing rotation of a rotor in a motor according to one embodiment.

FIG. 6—Finite State Machine Based Implementation of a Method for Inducing Rotation of a Rotor in a Motor FIG. 6 shows an exemplary embodiment of one possible implementation of a method for aligning a rotor in a motor. The state diagram portion shown in FIG. 6 may be implemented as part of a finite state machine based digital controller for controlling operation of a motor, according to some embodiments. For example, FIG. 6 might control the forced commutation function of a finite state machine which also includes one or more of portions for rotor alignment, natural commutation, motor braking, a halt/restart sequence, stall detection, and/or other functions. It should be noted that the state diagram implementation of FIG. 6 represents one possible implementation of the method shown in and described with respect to FIG. 5, and is intended to be exemplary only; other implementations are also envisioned.

Figure 7:
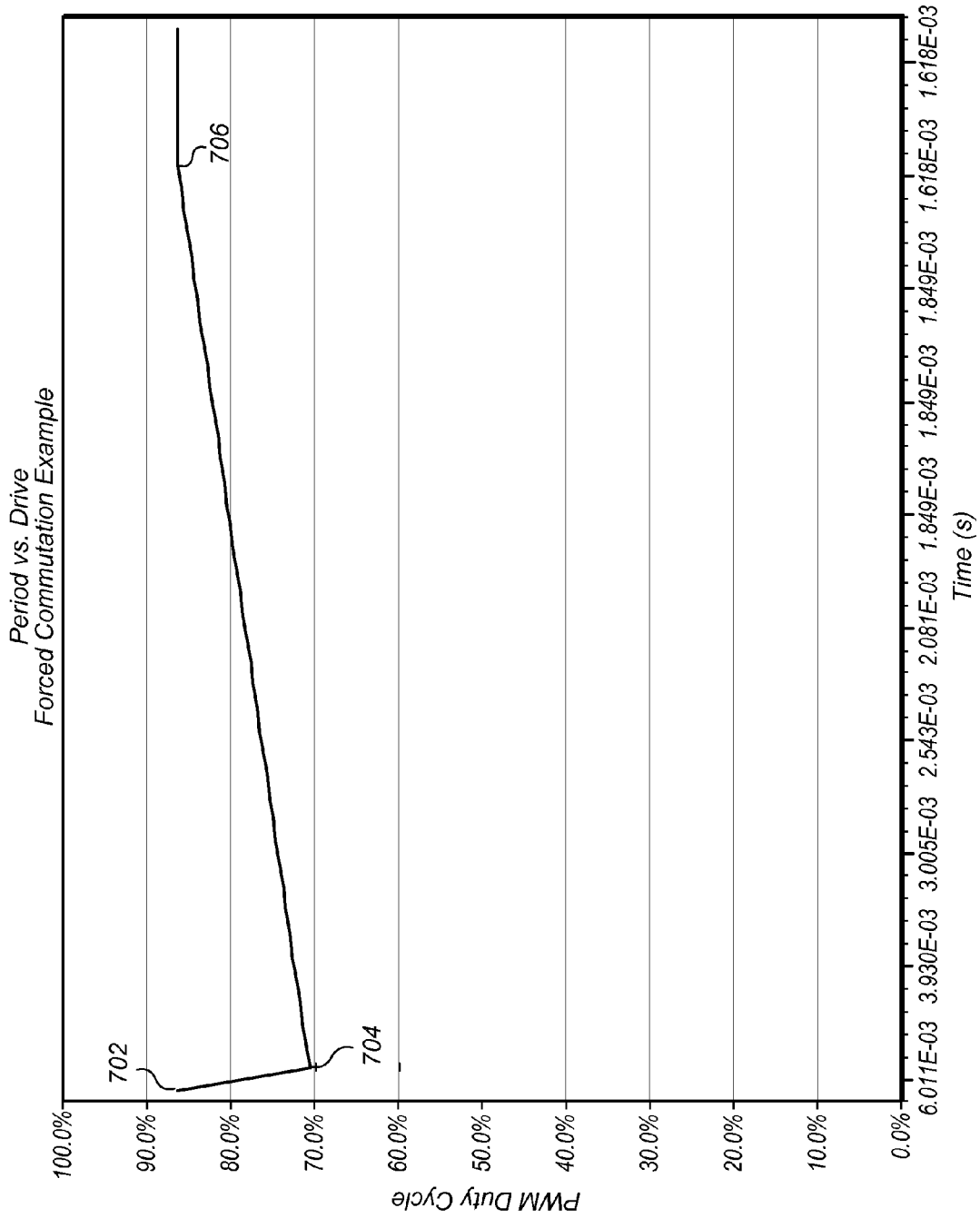
FIG. 7 is an exemplary graph depicting PWM duty cycle versus forced commutation period according to one embodiment.

FIG. 7—Graph of Excitation Level vs. Forced Commutation Period

FIG. 7 is a graph depicting excitation level vs. forced commutation period according to one embodiment. In the embodiment shown, the excitation level is a PWM duty cycle. At 702, the coils may be initially excited at a maximum PWM duty cycle and a relatively long rotation period. Over the first period of time, e.g., from 702 to 704, the PWM may be decreased to a much lower duty cycle and the rotation period may be decreased to a slightly shorter rotation period. Over the second period of time, e.g., from 704 to 706, the PWM may be increased back to a relatively high duty cycle, as the rotation period continues to be decreased.

It should be noted that the embodiment shown in FIG. 7 represents one possible implementation based on the method shown in and described with respect to FIG. 5, and is intended to be exemplary only, and should not be considered limiting to the disclosure as a whole. Other implementations, which may utilize different rotation periods, PWM duty cycles (or linear voltages instead of PWM duty cycles), and/or overall drive profiles, are also contemplated.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for initiating rotation of a rotor in a motor, wherein the motor comprises the rotor and a plurality of pairs of electromagnets, the method comprising:
   determining a rotation period;
   exciting one or more pairs of electromagnets of the plurality of pairs of electromagnets at a first excitation level, wherein the excited one or more pairs of electromagnets are determined based on the rotation period;
   decreasing, over a first period of time, the excitation level to a second excitation level, wherein the second excitation level is a lower excitation level than the first excitation level;
   increasing, over a second period of time, the excitation level to a third excitation level, wherein the third excitation level is a higher excitation level than the second excitation level;
   decreasing, over the first and second periods of time, the rotation period;
   wherein the motor is configured to use an undriven electromagnet of the plurality of pairs of electromagnets to indirectly detect a position of the rotor, wherein the indirect detection requires rotation of the rotor;
   wherein said exciting the one or more pairs of electromagnets, decreasing the excitation level to the second excitation level over a first period of time, increasing the excitation level to the third excitation level over a second period of time, and decreasing the rotation period over the first and second periods of time, initiate rotation of the rotor in the motor without knowledge of an exact position of the rotor.

2. The method of claim 1, further comprising:
   determining commutation timing based on the rotation period;
   wherein the excited one or more pairs of electromagnets are determined based on a commutation pattern and the commutation timing.

3. The method of claim 1, wherein the first, second, and third excitation levels are one of:
   percentages of a maximum pulse width modulation duty cycle; or
   linear voltages.

4. The method of claim 1,
   wherein the second period of time is longer than the first period of time.

5. The method of claim 1,
   wherein said increasing the excitation level to the third excitation level comprises incrementing the excitation level of the one or more pairs of electromagnets through one or more intermediate excitation levels over the second period of time.

6. The method of claim 1,
   wherein said decreasing the rotation period over the first and second periods of time comprises decrementing the rotation period through one or more intermediate rotation periods over the first and second periods of time.

7. The method of claim 1,
   wherein the motor is a three phase motor, wherein the plurality of pairs of electromagnets comprise three pairs of electromagnets.

8. The method of claim 1,
   wherein the rotation period is determined, and decreased over the first and second periods of time, according to a forced commutation pattern configured to initiate rotation of the rotor in the motor without knowledge of the exact position of the rotor.

9. The method of claim 1,
   wherein exciting the one or more pairs of electromagnets, decreasing the excitation level to the second excitation level over a first period of time, increasing the excitation level to the third excitation level over a second period of time, and decreasing the rotation period over the first and second periods of time accelerates the rotor to a speed at which back electro-motive—force (BEMF) is sufficient to detect a position of the rotor using an undriven electromagnet of the plurality of pairs of electromagnets.

10. A chip, comprising logic configured to initiate rotation of a rotor in a motor, wherein the motor comprises the rotor and a plurality of pairs of electromagnets, wherein the logic is configured to:
determine a rotation period;
excite one or more pairs of electromagnets of the plurality of pairs of electromagnets at a first excitation level, wherein the excited one or more pairs of electromagnets are determined based on the rotation period;
decrease, over a first period of time, the excitation level to a second excitation level, wherein the second excitation level is a lower excitation level than the first excitation level;
increase, over a second period of time, the excitation level to a third excitation level, wherein the third excitation level is a higher excitation level than the second excitation level;
decrease, over the first and second periods of time, the rotation period;
wherein the motor is configured to use an undriven electromagnet of the plurality of pairs of electromagnets to indirectly detect a position of the rotor, wherein the indirect detection requires rotation of the rotor;
wherein said exciting the one or more pairs of electromagnets, decreasing the excitation level to the second excitation level over a first period of time, increasing the excitation level to the third excitation level over a second period of time, and decreasing the rotation period over the first and second periods of time, initiate rotation of the rotor in the motor without knowledge of an exact position of the rotor.

11. The chip of claim 10, wherein the logic is further configured to:
determine commutation timing based on the rotation period;
wherein the excited one or more pairs of electromagnets are determined based on a commutation pattern and the commutation timing.

12. The chip of claim 10, wherein the first, second, and third excitation levels are one of:
percentages of a maximum pulse width modulation duty cycle; or
linear voltages.

13. The chip of claim 10,
wherein the second period of time is longer than the first period of time.

14. The chip of claim 10,
wherein said increasing the excitation level to the third excitation level comprises incrementing the excitation level of the one or more pairs of electromagnets through one or more intermediate excitation levels over the second period of time.

15. The chip of claim 10,
wherein said decreasing the rotation period over the first and second periods of time comprises decrementing the rotation period through one or more intermediate rotation periods over the first and second periods of time.

16. The chip of claim 10,
wherein the motor is a three phase motor, wherein the plurality of pairs of electromagnets comprise three pairs of electromagnets.

17. A non-transitory computer readable memory medium, comprising program instructions executable to initiate rotation of a rotor in a motor, wherein the motor comprises the rotor and a plurality of pairs of electromagnets, wherein the program instructions are executable to:
determine a rotation period;
excite one or more pairs of electromagnets of the plurality of pairs of electromagnets at a first excitation level, wherein the excited one or more pairs of electromagnets are determined based on the rotation period;
decrease, over a first period of time, the excitation level to a second excitation level, wherein the second excitation level is a lower excitation level than the first excitation level;
increase, over a second period of time, the excitation level to a third excitation level, wherein the third excitation level is a higher excitation level than the second excitation level;
decrease, over the first and second periods of time, the rotation period;
wherein the motor is configured to use an undriven electromagnet of the plurality of pairs of electromagnets to indirectly detect a position of the rotor, wherein the indirect detection requires rotation of the rotor;
wherein said exciting the one or more pairs of electromagnets, decreasing the excitation level to the second excitation level over a first period of time, increasing the excitation level to the third excitation level over a second period of time, and decreasing the rotation period over the first and second periods of time, initiate rotation of the rotor in the motor without knowledge of an exact position of the rotor.

18. The memory medium of claim 17, wherein the logic is further configured to:
determine commutation timing based on the rotation period;
wherein the excited one or more pairs of electromagnets are determined based on a commutation pattern and the commutation timing.

19. The memory medium of claim 17,
wherein the second period of time is longer than the first period of time.

20. The memory medium of claim 17,
wherein said increasing the excitation level to the third excitation level comprises incrementing the excitation level of the one or more pairs of electromagnets through one or more intermediate excitation levels over the second period of time.

21. The memory medium of claim 17,
wherein said decreasing the rotation period over the first and second periods of time comprises decrementing the rotation period through one or more intermediate rotation periods over the first and second periods of time.

22. An electronic motor, comprising:
a rotor comprising a permanent magnet;
a stator comprising a plurality of pairs of electromagnets;
logic configured to:
determine a rotation period;
excite one or more pairs of electromagnets of the plurality of pairs of electromagnets at a first excitation level, wherein the excited one or more pairs of electromagnets are determined based on the rotation period;
decrease, over a first period of time, the excitation level to a second excitation level, wherein the second excitation level is a lower excitation level than the first excitation level;
increase, over a second period of time, the excitation level to a third excitation level, wherein the third excitation level is a higher excitation level than the second excitation level; and
decrease, over the first and second periods of time, the rotation period;

wherein the motor is configured to use an undriven electromagnet of the plurality of pairs of electromagnets to indirectly detect a position of the rotor, wherein the indirect detection requires rotation of the rotor;

wherein said exciting the one or more pairs of electromagnets, decreasing the excitation level to the second excitation level over a first period of time, increasing the excitation level to the third excitation level over a second period of time, and decreasing the rotation period over the first and second periods of time, initiate rotation of the rotor without knowledge of an exact position of the rotor.

* * * * *